Feb. 6, 1962 H. W. BOTELER 3,020,020
DIAPHRAGM VALVE
Filed Sept. 29, 1958 5 Sheets-Sheet 2
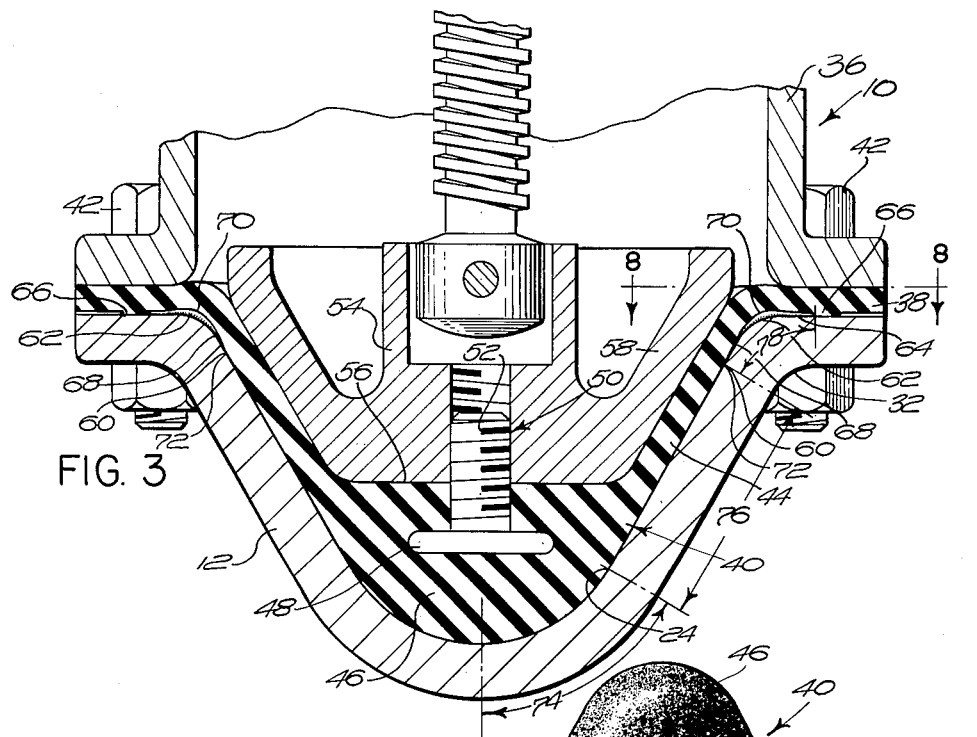
FIG. 3
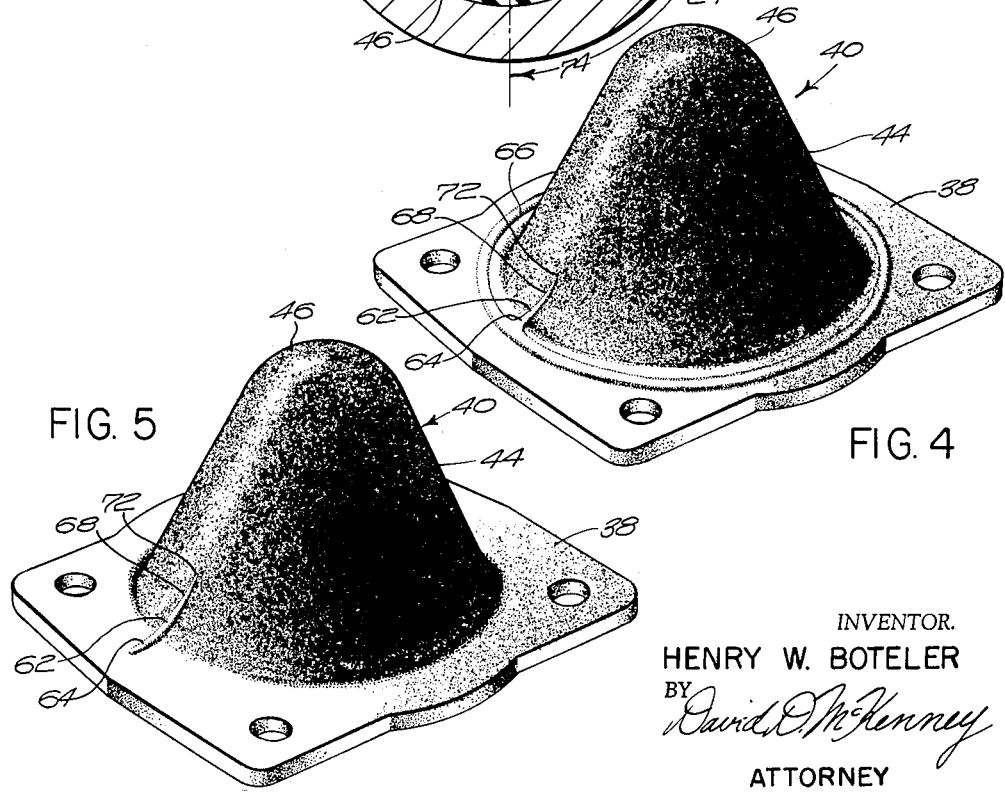
FIG. 5
FIG. 4
INVENTOR.
HENRY W. BOTELER
BY David D. McKenney
ATTORNEY Feb. 6, 1962 H. W. BOTELER 3,020,020
DIAPHRAGM VALVE Filed Sept. 29, 1958 5 Sheets-Sheet 3

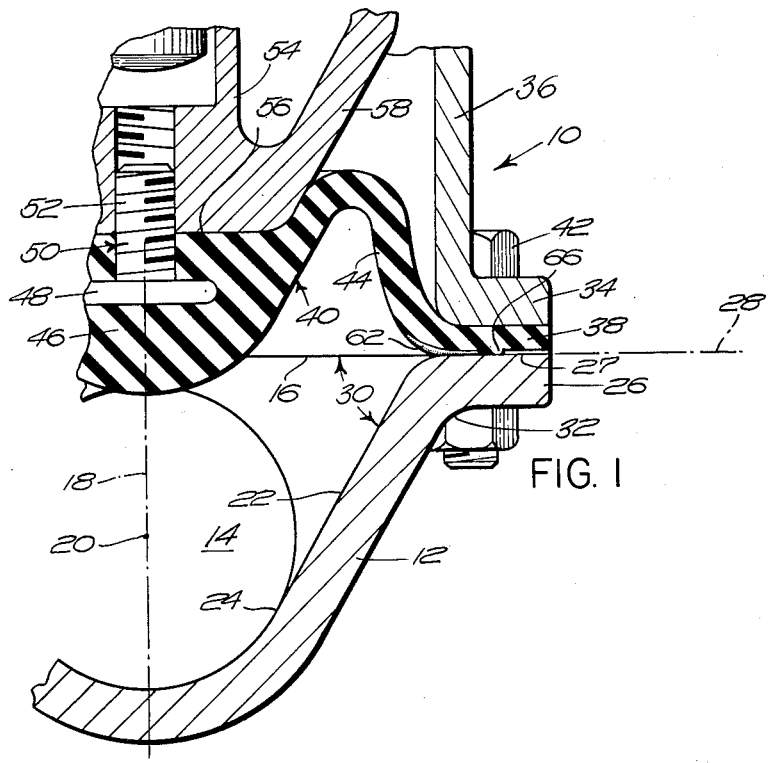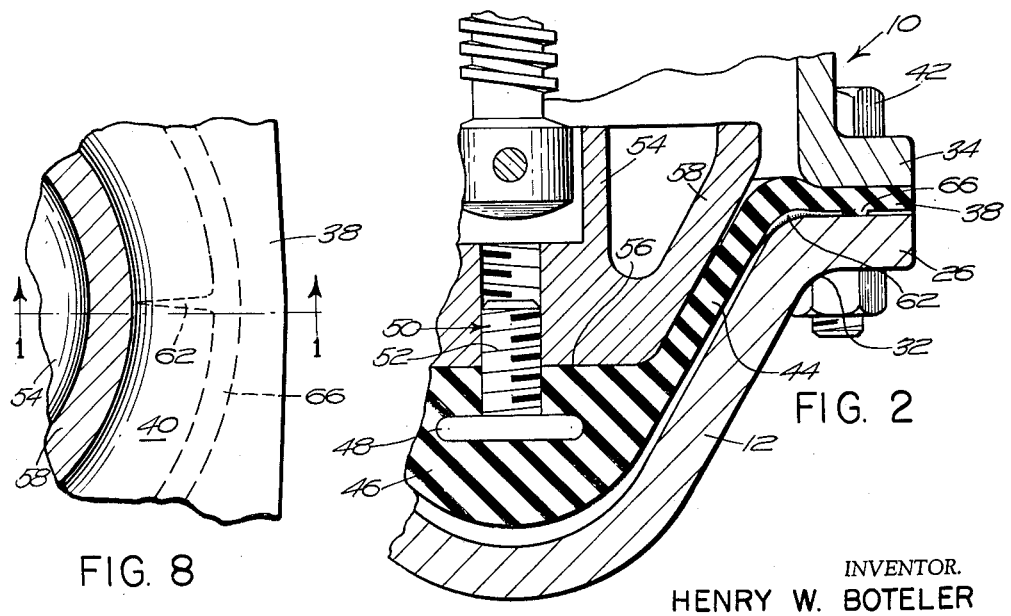

INVENTOR.
HENRY W. BOTELER
BY David D. McKenney
ATTORNEY

Feb. 6, 1962　　　　H. W. BOTELER　　　　3,020,020
DIAPHRAGM VALVE
Filed Sept. 29, 1958　　　　　　　　　　　　5 Sheets-Sheet 4

INVENTOR.
HENRY W. BOTELER
BY David O. McKenney
ATTORNEY

United States Patent Office 3,020,020
Patented Feb. 6, 1962

3,020,020
DIAPHRAGM VALVE
Henry W. Boteler, East Greenwich, R.I., assignor to Grinnell Corporation, Providence, R.I., a corporation of Delaware
Filed Sept. 29, 1958, Ser. No. 764,082
12 Claims. (Cl. 251—331)

This invention relates to improvements in diaphragm valves of the kind having a substantially straight-through bore or passageway which is uninterrupted by any substantial weir.

Diaphragm valves of this kind have been particularly well received by industry because they do not have obstructions or pockets at the side of the bore opposite the opening over which the diaphragm is secured. Accordingly, the flow through such valves is as uninterrupted as possible when the valve is open and the collection of sediment in crevices is kept at a minimum.

A disadvantage encountered in this type of diaphragm valve has been the difficulty in obtaining a fluid seal at certain portions of the seating when the valve is closed. Each half of the diaphragm seating extending inwardly and across the valve body from the clamped diaphragm margin on one side of the valve to the bottom of the passageway surface may be considered as consisting of three distinct seating portions. Since these two halves are identical only those portions on one side need be described. The first of these seating portions is an arcuate portion originating at the bottom of the straight-through passageway and extending substantially coincident with it to the point of tangency of the passageway and sloping wall surface at the side of the valve. The second portion is a straight portion substantially coincident with this sloping wall surface and leading from the point of tangency to the opening. This second portion blends smoothly with the first portion at the point of tangency just as the sloping wall surface blends smoothly and tangentially with the passageway surface. The third portion extends from a point a short distance down the sloping wall surface below the opening around the corner where the wall surface reaches the opening and outward a short distance along the opening flange. In some diaphragm valves having a straight-through bore, the first and second portions of this seating take the form of a rib slightly raised from the walls and passageway. However, as far as is known in each case where such a rib has been employed it has terminated at the corner of the sloping wall surface and flange. In other valves of this type these seating portions may be exactly coincident with the wall and passageway, or in other words there are no ribs and the seating is on the wall and passageway surfaces.

In the earliest forms of this type of valve difficulties were encountered in providing a compressor element (which presses the diaphragm against the seating) which would so act in cooperation with the diaphragm and seating that an adequate unit pressure would be exerted by the diaphragm against the third seating portion without inadequate or excessive pressure at the first two seating portions. These difficulties arose because parts of the early compressors extended over the diaphragm opposite the third seating portions, that is, over the opening flange, and unless the compressor, diaphragm and seating were very exactly made and assembled these extending compressor parts would press the diaphragm too early or too late with respect to the other parts of the compressor pressing the diaphragm. In fact, the dimensions of the compressor, diaphragm and seating are so critical that the practice prior to this invention for obtaining a closure at this third seating portion without damaging the diaphragm has been to omit the extending parts of the compressor, and to form the diaphragm so that its central bulge does not reach the center of the valve seating without stretching. This stretching pulls the diaphragm tight over the corner at this third portion, and this alone has been relied upon to achieve a sealing pressure, with no positive pressing of the diaphragm against the third seating portion by the compressor. However this stretching often falls short of working an effective seal, and leakage between the diaphragm and the third portions of the seating may occur even when extreme closing force is exerted by the compressor.

Furthermore, even in those valves having compressors from which the extending compressor parts referred to are not omitted (so that positive pressing is obtained at the third seating portions) there are still some spaces between the ends of these extending compressor parts and the diaphragm margin which is clamped between the bonnet and body flanges farther out on the body flange. These spaces arise in part from the relatively large radius which effects a transition from the inner surface of the bonnet to the bonnet clamping flange and which is for the purpose of preventing a sharp bend in the diaphragm at this point when the valve is open. These spaces are also due to the clearance required between the ends of these extending compressor parts and the interior bonnet surface for easy assembly. These spaces often result in leakage even if the above described stretching is employed.

An illustration of these spaces may be seen by reference to FIG. 1 of U.S. Patent 2,705,124 to Price which is a typical valve construction having a straight-through bore. In this figure the spaces referred to are between the edge of the compressor 31 and the interior surface of the bonnet at the ends of the seating. It is seen that no direct compression is exerted by the compressor on the part of the diaphragm in these spaces.

By the present invention the unit pressure at the third portion of the seating is brought to that level which assures a closure in this area by employing the stretching technique described and by using a special short rib on the diaphragm or seating which rib extends along the third seating portion which includes the flange of the opening and the rounded corner.

In achieving a tight, leak-proof valve closure it has been found that the most important consideration is the unit pressure between the diaphragm and the seating. The band over which a satisfactory pressure is present must, of course, have some significant width, but in practice this can be quite small. No benefit is achieved by providing the minimum unit pressure over a wide band, whereas when the unit pressure is below the minimum across the band this cannot be cured by increasing the width of the band.

It has been found that a seating band of adequate width and with sufficient unit pressure can be obtained at the third seal by stretching the diaphragm during closing with the special rib referred to on the body or diaphragm.

Accordingly, it is one object of the present invention to provide a diaphragm valve in which there is provided at the portion of the seating on the body opening flange between the opening and clamped diaphragm margin a short rib extending along this portion and integral with the body or diaphragm.

Another object is to provide a diaphragm valve in which there is provided at the portion of the seating on the body opening flange between the opening and the clamped diaphragm margin and at the portion of the seating around the rounded corner formed at the opening a short rib extending along this portion and integral with the body of diaphragm.

Another object is to provide a diaphragm valve of the previous objects in which the rib is parallel to the seating.

Another object is to provide a diaphragm valve of the previous objects in which the rib blends smoothly at its inner ends into the surface with which it is integral.

Another object of the invention is to provide a diaphragm valve in which the surface of the flange around the body opening and the surface of the tapered side walls form a corner which is rounded, in which the diaphragm margin is clamped against the flange surface on one side of said corner and the diaphragm sleeve is squeezed against the tapered side walls on the other side of said corner when the valve is closed and in which a rib on said diaphragm or body originates where the squeezing of the diaphragm sleeve by the compressor begins and extends around the corner to the clamped diaphragm margin, so that a greater change of direction of the diaphragm sleeve portion is achieved around the corner when the seating is just commenced than would be achieved around the corner without such a rib.

Another object is to provide an improved diaphragm valve of the kind having a substantially straight-through bore which is uninterrupted by any substantial weir which valve is inexpensive, easy to manufacture and simple to service.

Other objects will appear hereinafter.

The accompanying drawings show and the specification describes preferred embodiments of the present invention. However, they are merely illustrative of the invention which is not intended to be limited to them.

In the drawings:

FIGURE 1 is a cross sectioned side elevation view of a portion of a valve embodying the present invention taken on line 1—1 of FIG. 8, the valve being shown in open position;

FIGURE 2 is a view like FIG. 1 but showing the position of the parts when the valve is being closed but before the diaphragm has begun to be stretched;

FIGURE 3 is a view like FIG. 1 but showing the valve in the closed position;

FIGURE 4 is a perspective view of the diaphragm used in FIGS. 1, 2 and 3;

FIGURE 5 is a perspective view of another diaphragm illustrating a second embodiment;

FIGURE 8 is a fragmentary cross sectioned plan view taken on line 8—8 of FIG. 3;

Figure 6:
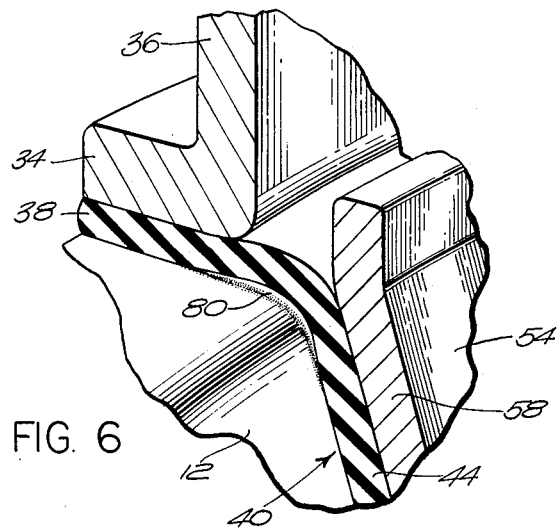
FIGURE 6 is a fragmentary view of a valve in closed position showing another embodiment of the invention in which the rib is integral with the valve body.

Referring now more particularly to FIG. 1 of the drawings the diaphragm valve 10 there shown has a body 12 with a straight passageway 14 therethrough and a substantially circular opening 16 at the center of the body on one side thereof. The axis 18 of this opening is at right angles to and intersects the axis 20 of the passageway 14, and the opening has a somewhat larger diameter than the diameter of the passageway so that straight side walls 22 from the opening to the passageway and tangent with the latter at points 24 have a substantial taper.

A flange 26 is provided on the body around the opening 16 with an upper (in FIG. 1) surface 27 in a plane 28 at substantially right angles with the opening axis 18 and therefore forms a large angle 30 with the side walls 22. The corner 32 resulting from the junction of the flange surface 27 and side walls 22 is rounded as indicated.

The outer portions of the opening flange 26 and the flange 34 on the lower (in FIG. 1) end of a bonnet 36 serve to clamp the margin 38 of a rubber or rubber-like diaphragm 40 to the opening flange surface to prevent leakage of the fluid carried by the valve between this diaphragm margin and flange. Bolts 42 through suitable holes (not shown) in the two flanges provide the clamping force. The central, unclamped portion of the diaphragm has an annular flexible sleeve 44 joined at its inner edge to a thick hub 46 in which is embedded the head 48 of a threaded stud 50 the shank 52 of which is threaded into a compressor 54. The lower surface 56 of this compressor fits nicely against the upper surface of the diaphragm hub around the stud, and the sides 58 of the compressor extend upwardly at the angle of the sloping side walls 22. The compressor is actuated in any conventional way such as by a handwheel or air motor to move along the body opening axis 18 and move the diaphragm to and from the body.

FIGURE 3 shows that when the compressor is advanced toward the body until the diaphragm engages it a seating is achieved all the way across the body from one clamped diaphragm margin to the other. This figure also shows that between the clamped diaphragm margin 38 and the point 60 on the body around the corner 32 of the opening where the squeezing of the diaphragm sleeve between the compressor and body begins this sleeve is bent around a corner which is sharper than the corner 32 formed by the flange surface 27 and the side walls 22. The reason for this sharper corner is a rib 62 integral with the diaphragm at this corner. This rib has one end 64 at the clamped diaphragm margin where it blends into another continuous circular rib 66 extending around the diaphragm and has its other end 68 beyond the rounded corner 70 which is in the surface of the sleeve portion of the diaphragm and gradually disappearing into the surface of this sleeve portion at about the point 72 where this sleeve portion begins to be squeezed between the compressor and body seating.

FIGURE 3 shows that in clamping the diaphragm margin the circular rib 66 and the end 64 of the rib 62 are squeezed substantially flat thereby enhancing the sharpness of the corner around which the diaphragm sleeve portion is drawn because of the rib 62. Thus over the first and second portions of the seating, numbered 74 and 76, respectively, the diaphragm is positively pressed against these portions by the compressor 54.

Figure 9:
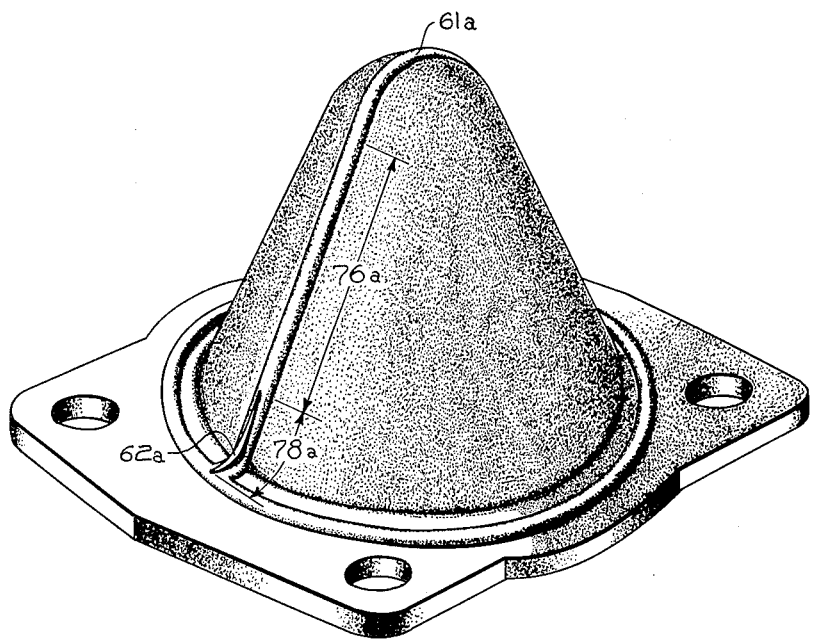
FIGURE 9 is a perspective view of another diaphragm illustrating still another embodiment of my invention.

However, over the third portion 78 of the seating there is no such positive pressing because no part of the compressor directly overlies the corner 32 and the flange surface 27 between this corner and the clamped diaphragm margin, and over this portion the stretching of the diaphragm sleeve 44 is relied upon to achieve pressure of the diaphragm against the seating. As explained earlier it has been found that such stretching does not develop enough pressure between a flat diaphragm surface and a flat seating surface, and in accordance with one form of the present invention FIGS. 1 to 4 show a short rib 62 integral with the diaphragm sleeve 44 opposite the third seating portion 78. The rib achieves an adequate unit pressure because it concentrates on the top of the rib a large portion of the force resulting from the stretching in the neighborhood of the third seating portion 78, and because it causes the diaphragm sleeve portion at the corner to change direction to a greater extent than would be the case if there were no rib or if the rib extended at a uniform height all the way across the diaphragm, or in other words from one clamped margin to the other across the center of the diaphragm. It is within the scope of this invention to have such a rib extending all the way across the diaphragm providing that its height is greater at the corners so that the change of direction of the diaphragm at these corners is greater than the change which is caused merely by the intersection of the flange surface and the tapered side walls. It is preferred not to have any rib extend across the center of the diaphragm because of its effect on the flow through the valve when the valve is open. Furthermore where the compressor squeezes the diaphragm against the first and second seating portions no rib is needed to increase the unit pressure. In those cases where it may be desired to have the rib extend across the diaphragm such a construction is shown in FIG. 9 wherein 61a designates a rib extending all the way across the diaphragm including the portion complemental to the second seating portion on the body and designated 76a and the portion complemental to the third seating portion on the body and designated 78a. A short rib 62a is integral with the larger rib portion 78a and decreases in height and width and gradually disappears into the larger rib at the end of portion 76a of the larger rib.

The stretching referred to is best understood by comparing FIGS. 2 and 3, the former showing the shape of the diaphragm before any stretching is begun. Thus, for example, FIG. 2 shows the form and dimensions of the diaphragm as it is molded and as it appears in FIG. 4.

FIGURE 5 shows another embodiment of the invention in which the rib 62 is again on the diaphragm and integral with the material thereof, but in which there is no annular rib 66 such as in FIG. 4. The purpose of this annular rib 66 is to improve the clamping seal at the diaphragm margin between the body and bonnet flanges for a given tension on the bolts 42. It is not essential to employ this annular rib, however, because the diaphragm margin is positively pressed between two metal surfaces. Where no such annular rib 66 is used, as in FIG. 5, both ends of the short rib 62 taper down to and blend smoothly with the diaphragm surface, and the outer end of the rib so blends at the beginning of he clamped diaphragm margin.

Figure 7:
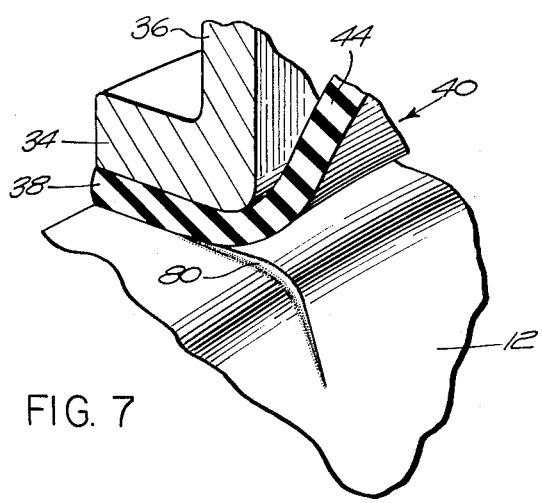
FIGURE 7 is a view like FIG. 6 but showing the valve in open position.

The unit pressure increasing rib at the third seating portion may also be integral with the valve body instead of or in addition to a rib integral with the diaphragm. Such a rib on the body is indicated by the numeral 80 in FIGS. 6 and 7. The other parts shown in these views are indicated by the same numerals used in FIGS. 1, 2 and 3.

Figure 10:
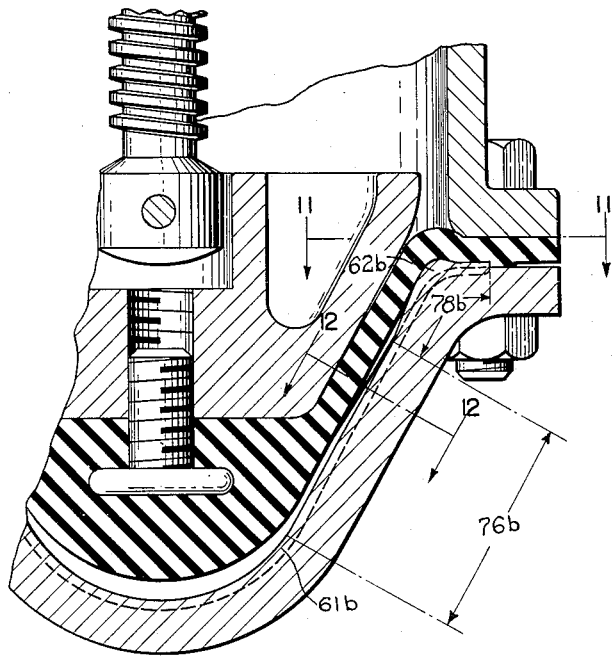
FIGURE 10 is a view similar to that of FIG. 2 showing still another embodiment of my invention.
Figure 11:
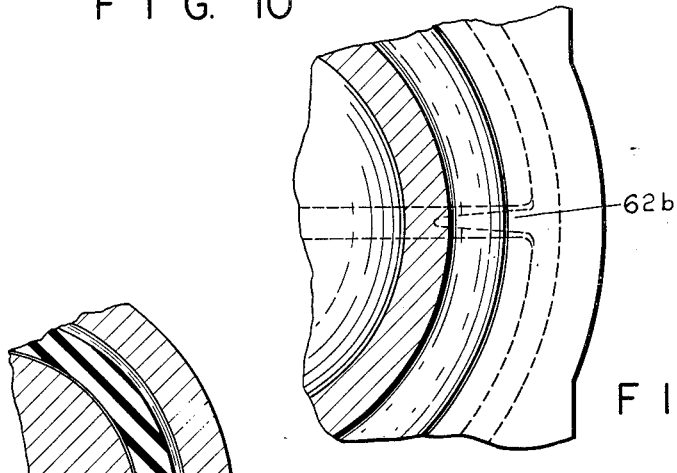
FIGURE 11 is a fragmentary cross sectioned plan view taken on line 11—11 of FIG. 10.
Figure 12:
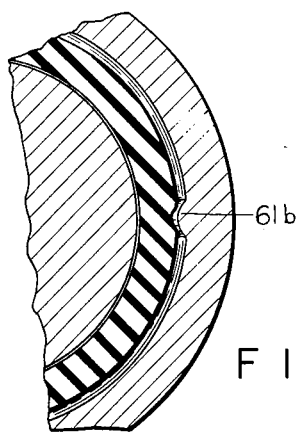
FIGURE 12 is a fragmentary cross section taken on line 12—12 of FIG. 10.

Similarly to FIG. 9, a rib may extend across the entire valve, being integral with the valve body rather than the diaphragm. This embodiment may be clearly seen in FIGS. 10–12.

To illustrate the similarity of the constructions in FIG. 9 and FIGS. 10–12, comparable portions have been designated with similar numbers but with different letters to distinguish the differences. Therefore, 61b indicates a rib extending all the way across the valve body including the portions 76b and 78b designated respectively as the portions adjacent the second seating portion and third seating portion. A short rib 62b is integral with the larger rib portion 78b and decreases in height and width and gradually disappears into the larger rib at the end of portion 76b of the larger rib.

For best results the short ribs 62, 62a and 62b should have a height at their highest parts of about one quarter the thickness of the diaphragm sleeve 44.

I claim:

1. A diaphragm valve comprising a body having a substantially straight flow passageway therethrough, a seating in said body comprising a first seating portion formed by an arcuate section of said passageway at one side of said body, said body being formed with an enlargement having a lateral opening opposing said first seating portion, the enlargement including a pair of second seating portions formed on opposite sides of said body surfaces tapering inwardly from said lateral opening toward said first seating portion and at the ends of said first seating portion merging substantially tangentially therewith, said body also having a flange member around said lateral opening with a surface extending at a substantial angle to said tapering surface, a bonnet over said lateral opening and secured to said body, a flexible diaphragm member covering said lateral opening and having its margin clamped between said body flange member and said bonnet, a pair of third seating portions on said flange member surface, each third seating portion being located between one of said second seating portions and the clamped margin of said diaphragm member, and a raised rib formed on one of said body flange and diaphragm members extending along each of said third seating portions from the lateral opening to the clamped margin of said diaphragm member.

2. The diaphragm valve of claim 1 wherein each said raised rib decreases in height toward its end which extends toward the center of the valve and gradually disappears into the surface of the member on which it is formed substantially at the end of the second seating portion which is at the opening.

3. The diaphragm valve of claim 1 wherein each said raised rib decreases in height and width toward its end which extends toward the center of the valve and gradually disappears into the surface of the member on which it is formed substantially at the end of the second seating portion which is at the opening.

4. A diaphragm valve comprising a body having a substantially straight flow passageway therethrough, a seating in said body comprising a first seating portion formed on an arcuate section of said passageway at one side of said body, said body being formed with an enlargement having a lateral opening opposing said first seating portion, the enlargement including a pair of second seating portions formed on opposite sides of said body by surfaces tapering inwardly from said lateral opening toward said first seating portion and at the ends thereof merging substantially tangentially therewith, said body also having a flange member around said lateral opening with a surface extending at a substantial angle to said tapering surfaces, a bonnet over said lateral opening and secured to said body, a flexible diaphragm member covering said lateral opening and having its margin clamped between said body flange member and said bonnet, a pair of third seating portions on said flange member surface, each third seating portion being located between one of said second seating portions and the clamped margin of said diaphragm member, a pair of first raised ribs on one of said body and diaphragm members, each said first rib extending along one of said second seating portions, and a pair of second raised ribs on one of said body flange and diaphragm members each said second rib extending along one of said third seating portions from the lateral opening to the clamped margin of said diaphragm member, each said second rib being substantially higher than the adjacent portions of said first ribs and being continuous therewith.

5. The diaphragm valve of claim 4 where said second rib is also narrower than said first rib.

6. The diaphragm valve of claim 5 wherein one end of each second rib extends along the top of a portion of the adjacent end of said first rib.

7. The diaphragm valve of claim 4 wherein each said second rib decreases in height toward its end which extends toward the center of the valve and gradually disappears into the surface of the member on which it is formed at the point of the first rib substantially at the end of the adjacent second seating portion which is at the opening.

8. The diaphragm valve of claim 4 wherein each said second raised rib decreases in height and width toward its end which extends toward the center of the valve and gradually disappears into the surface of the member on which it is formed at the point of the first rib substantially at the end of the adjacent second seating portion which is at the opening.

9. A diaphragm valve comprising a body having a substantially straight flow passageway therethrough, a seating in said body comprising a first seating portion formed by an arcuate section of said passageway at one side of said body, said body being formed with an enlargement having a lateral opening opposing said first seating portion, the enlargement including a pair of second seating portions formed on opposite sides of said body by substantially straight surfaces tapering inwardly from said lateral opening toward said first seating portion and at the ends thereof merging substantially tangentially therewith, said body also having a flange member around said lateral opening with a surface thereon extending at a substantial angle to said tapering surfaces and merging therewith at a rounded corner, a bonnet over said lateral opening and secured to said body, a molded flexible diaphragm member covering said lateral opening between said body and bonnet, said diaphragm member having a peripheral marginal portion, having a thick reltively inflexible central portion and having an intermediate flexible rolling sleeve portion which joins said marginal and central portions, said diaphragm member marginal portion being clamped between said body flange member and said bonnet, valve operating mechanism carried by said bonnet and including an actuator associated with said diaphragm member to move the latter toward and away from said seating, said actuator having one position in which said diaphragm member sleeve portion is substantially parallel to said second seating portion and in which said diaphragm member central portion is spaced substantially from said first seating portion, whereby said diaphragm member sleeve portion is stretched when said actuator moves said diaphragm member until the central portion thereof engages said first seating portion, a pair of third seating portions on said flange member surface, each third seating portion being located between one of said second seating portions and the clamped diaphragm member margin, and a pair of raised ribs on one of said flange and diaphragm members, each rib extending along one of said third seating portions from the lateral opening to the clamped margin of said diaphragm member.

10. A diaphragm valve comprising a body having a substantially straight flow passageway therethrough, said body being formed with an enlargement having a lateral opening, said body also having surfaces tapering inwardly from said opening toward said passageway and at the sides thereof merging smoothly with the surfaces thereof, said body also having a flange member around said lateral opening with a surface extending outwardly therefrom at a substantial angle to the tapered surfaces, said body also having a rounded corner at the intersection of said flange member and tapered surfaces, a bonnet over said lateral opening and secured to said body, a diaphragm member covering said opening, said diaphragm member having a marginal portion clamped between said bonnet and a clamping region on said body flange member outward from said corner, said diaphragm member having a thick relatively inflexible central portion and having an intermediate flexible rolling sleeve portion which joins said marginal and central portions, valve operating mechanism carried by said bonnet and including an actuator on the side of said diaphragm member opposite said body to move the diaphragm member toward the body to close the valve, said actuator pressing the diaphragm member central portion and part of the diaphragm member sleeve portion adjacent said central portion against the body over a seating region on said flow passageway and tapering surfaces when the valve is closed, said latter region terminating at ends located inwardly of said corner, a pair of additional seating regions on said body extending around said corner between said clamping region and the ends of said first mentioned seating region, the remaining part of said diaphragm member sleeve portion overlying said additional seating regions when said valve is closed, and a pair of raised ribs on one of said body flange and diaphragm members, each said rib originating substantially at one end of said first mentioned seating region and extending along one of said additional seating regions to said clamping region when the valve is closed, said ribs holding said remaining diaphragm member sleeve part away from said body at said flange and said corner.

11. For a diaphragm valve of the type having a body with a substantially straight flow passageway therethrough, a diaphragm comprising a marginal portion in a plane, a thick relatively inflexible central portion on one side of said plane, an intermediate flexible rolling sleeve portion which joins said marginal and central portions, said intermediate portion having a part which is adjacent the central portion in the form of a tapered sleeve the sides of which are at a substantial angle to said plane, said intermediate portion having its remaining part which is adjacent the marginal portion extending around a rounded corner from the tapered sides into and outward along said plane and a pair of opposed raised ribs on the surface of said sleeve portion which forms the exterior of said sleeve, each of said ribs originating substantially at the beginning of said corner and extending therearound and along said marginal portion.

12. For a diaphragm valve a valve body having a substantially straight flow passageway therethrough, said body being formed with an enlargement having a lateral opening, said body also having a surface on each side thereof tapering inwardly from said opening toward said passageway and at the sides thereof merging smoothly with the surfaces thereof, said body also having a flange member around said lateral opening with a surface extending outward therefrom at a substantial angle to the tapered surfaces, said body also having a rounded corner at the intersection of said flange member and said tapered surfaces, and said body also having a raised rib on each side of the valve, each of said ribs originating substantially at the end of one of the tapered surfaces adjacent the opening and extending around said corner onto and along said flange surface.

References Cited in the file of this patent

UNITED STATES PATENTS

| Re. 24,350 | Price | Aug. 27, 1957 |
| 2,840,340 | Kaufmann | June 24, 1958 |

FOREIGN PATENTS

| 437,463 | Great Britain | of 1935 |
| 785,393 | France | of 1935 |